United States Patent [19]
Gerry et al.

[11] Patent Number: 5,609,175
[45] Date of Patent: Mar. 11, 1997

[54] HANDLE AND HANDLE ACCESSORY FOR HAND CARRIED ARTICLES

[76] Inventors: Todd M. Gerry, 512 Main St., Ashfield, Mass. 01330; Mark E. Gerry, 1 Elm St., Byfield, Mass. 01922

[21] Appl. No.: 515,062

[22] Filed: Aug. 14, 1995

[51] Int. Cl.⁶ .................................................. A45B 1/00
[52] U.S. Cl. ......................... 135/16; 135/25.4; 135/15.1; 135/76
[58] Field of Search .................... D3/12, 16; D8/107; D21/230; 135/15.1, 16, 27, 65, 72, 76, 25.4

[56] References Cited

U.S. PATENT DOCUMENTS

| | | | |
|---|---|---|---|
| D. 11,698 | 3/1880 | Heiter et al. | D3/16 |
| D. 16,786 | 7/1886 | Currier | D8/107 |
| D. 160,567 | 10/1950 | Wylie | 220/710.5 |
| D. 274,674 | 7/1984 | Allen | D3/12 |
| D. 341,247 | 11/1993 | Hampton | D3/16 X |
| 1,023,741 | 4/1912 | Kreith | 30/340 X |
| 2,991,907 | 7/1961 | Kinnison | 16/110 R |
| 4,121,744 | 10/1978 | Minear | 16/114 R |
| 4,244,220 | 1/1981 | Henson et al. | D21/230 X |
| 4,542,585 | 9/1985 | Ito et al. | 16/110 R X |

*Primary Examiner*—Wynn E. Wood
*Attorney, Agent, or Firm*—Sherman and Shalloway

[57] ABSTRACT

The present invention provides an improved handle comprising an elongated body having an upper end and a lower end and a central channel extending longitudinally through the body which is adapted to receive an elongated shaft of a hand carried article and rigid finger engaging means extending from the body perpendicular to the longitudinal axis thereof and in linear alignment therealong. The finger engaging means has an aperture adapted to receive at least one finger of the hand therethrough when the handle is grasped, whereby the handle and the umbrella on which it is mounted are steadily supported on the fingers while permitting the user to manipulate other articles with the ends of the fingers. Alternative embodiments include an accessory handle adapted to be mounted on an existing handle whereby the advantages of this invention may be applied to existing articles.

7 Claims, 4 Drawing Sheets

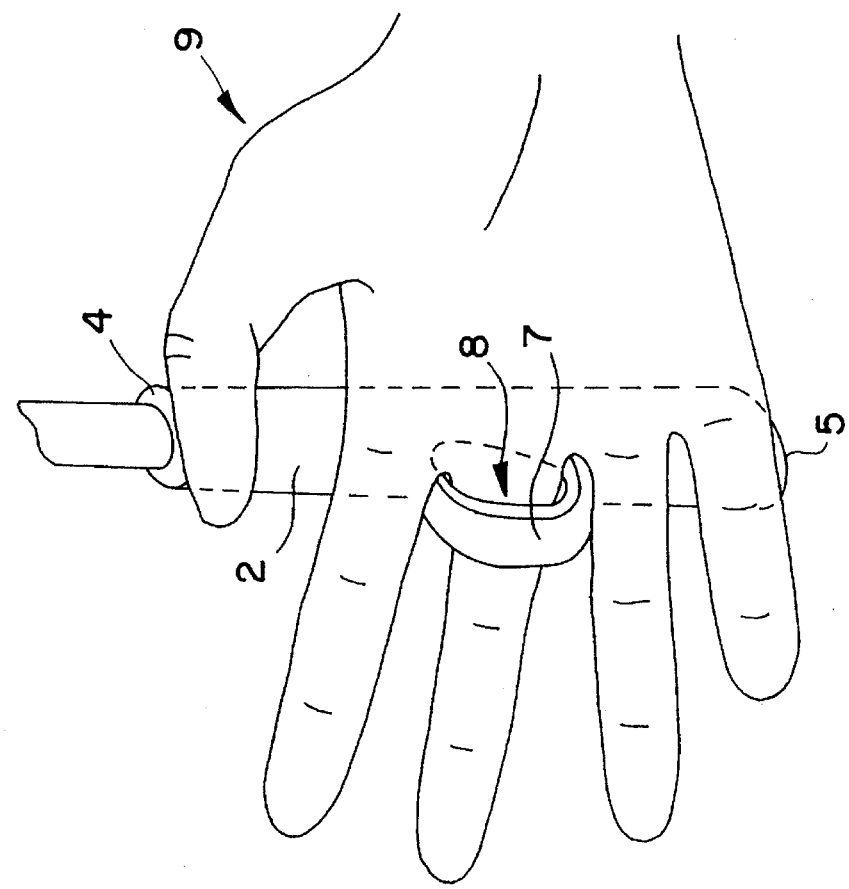
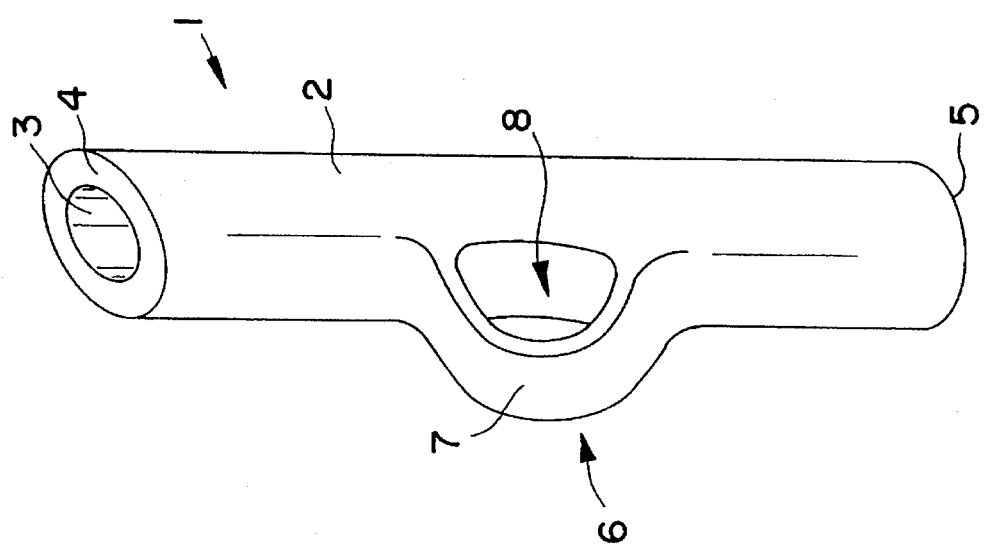
FIG. 2
FIG. 1

HANDLE AND HANDLE ACCESSORY FOR HAND CARRIED ARTICLES

FIELD OF THE INVENTION

The present invention is directed to an improved handle for hand carried articles, particularly articles of substantial length such as umbrellas, fishing rods and pole mounted articles, and to an accessory embodiment of the handle for use in retrofitting existing articles, to improve and simplify the user's ability to control the article with one hand while using the same hand to perform a complete range of normal functions as if the article were not being held. The present invention provides a structure for handles which engages the fingers of a user's hand in a manner which permits the article to be held in a position of normal use while simultaneously freeing the fingers and thumb to do work which could not otherwise be accomplished while holding the article in a conventional manner.

BACKGROUND OF THE INVENTION

Umbrellas and similar articles are normally held in one hand by placing the handle against the palm and wrapping the fingers and thumb around the handle. This grasping action, which is necessary to hold such an article upright in a position of use, completely occupies the fingers and thumb of the hand being used for this purpose to the exclusion of any other activity, such as writing and handling keys, mail, or other articles.

In the particular case of umbrellas it is often desirable to be able to use both hands to accomplish a task while simultaneously holding the umbrella above one's head to provide shelter from rain. One example of such a task is the sorting of mail by letter carriers while on their rounds. It is extremely difficult to both hold an umbrella and handle letters and packages so that both the letter carrier and the mail remain sheltered from the rain. In addition, anyone who has attempted to juggle packages, keys and an umbrella while attempting to open a car door, will appreciate the difficulty inherent in such activities when it is raining.

Other attempts to provide support for an umbrella while freeing the hands have been cumbersome, impractical or ineffective. In this regard, the umbrella handle attachment of U.S. Pat. No. 3,756,259, Beehler, is noted. This device comprises a removable, self-adjusting strap which slides onto an umbrella handle so as to provide a binding element for the user's hand which fits between the strap and the umbrella handle. However, the flexible nature of the strap together with its two point attachment only at its ends, allows the strap to "give" such that the umbrella can wobble or pivot about the hand. Only by maintaining two or more fingers curled around the handle in the normal manner can the umbrella be securely held and prevented from swaying relative to the user's hand.

Other devices have been suggested which are in the nature of clamps to secure an umbrella to a person's arms or shoulders, or to an object being carried or pulled by the user, such as a letter carrier's mail bag or cart. All of these devices have significant drawbacks including excessive complexity, difficulty in use, incomplete umbrella coverage, and the like.

SUMMARY OF THE INVENTION

It is an object of the present invention to provide an improved handle which permits one to securely hold or support an article while simultaneously freeing the fingers and thumbs to perform other tasks.

It is a further object of the present invention to provide an accessory handle which can be attached to an existing handle of an article and which permits one to securely hold the article while simultaneously freeing the fingers and thumbs to perform other tasks.

It is a still further object to provide an umbrella having an improved handle which permits one to securely hold an umbrella while simultaneously freeing the fingers and thumb to perform other tasks.

Further objects and advantages will become evident from the accompanying description and drawings.

The present invention provides an improved handle for hand carried articles, such as umbrellas, fishing rods, signs and the like, comprising an elongated body having an upper end and a lower end, a central channel extending longitudinally through the body which is adapted to receive an elongated shaft of an article on which the handle is mounted and rigid finger engaging means extending from the body perpendicular to the longitudinal axis thereof and in linear alignment therealong. The finger engaging means has at least one aperture adapted to receive at least one finger of the hand therethrough, whereby the handle, and the article on which it is mounted, are stabilized in an upright position on the fingers and against the hand, and are thereby held steady while permitting the user to manipulate other articles with the fingers and thumb.

The present invention further provides an improved umbrella comprising an elongated shaft having an upper end and a lower end, a plurality of articulated ribs pivotally joined to the shaft about the upper end, a flexible canopy attached to the ribs, a mechanism for articulating the ribs to open and close the canopy and a handle attached to the lower end of the shaft and extending in substantial longitudinal alignment with the shaft, wherein the improvement comprises rigid finger engaging means joined to and extending from the handle perpendicular to the longitudinal axis thereof and in linear alignment therealong. The finger engaging means has at least one aperture adapted to receive at least one finger of the hand therethrough whereby the umbrella is maintained in a position of use on the fingers and against the hand while the fingers are free and may be simultaneously used to manipulate other articles.

In addition, the present invention provides an accessory handle for mounting on the handles of articles. The accessory handle comprises an elongated handle engaging portion having a substantially concave inner surface and a substantially convex outer surface, the inner surface being adapted to closely engage the existing handle, rigid finger engaging means extending perpendicularly from and linearly along the outer surface, and attachment means to secure the accessory handle to the existing handle, whereby the accessory handle provides a means whereby the article can be held steady in a position of use on the hand while permitting the fingers and thumb of that hand to manipulate other articles.

BRIEF DESCRIPTION OF THE DRAWINGS

FIG. 1 is a perspective view of a first embodiment of the handle of the present invention.

FIG. 2 is a perspective view of the embodiment of FIG. 1 in use on a hand.

DETAILED DESCRIPTION OF THE INVENTION

Figure 3:
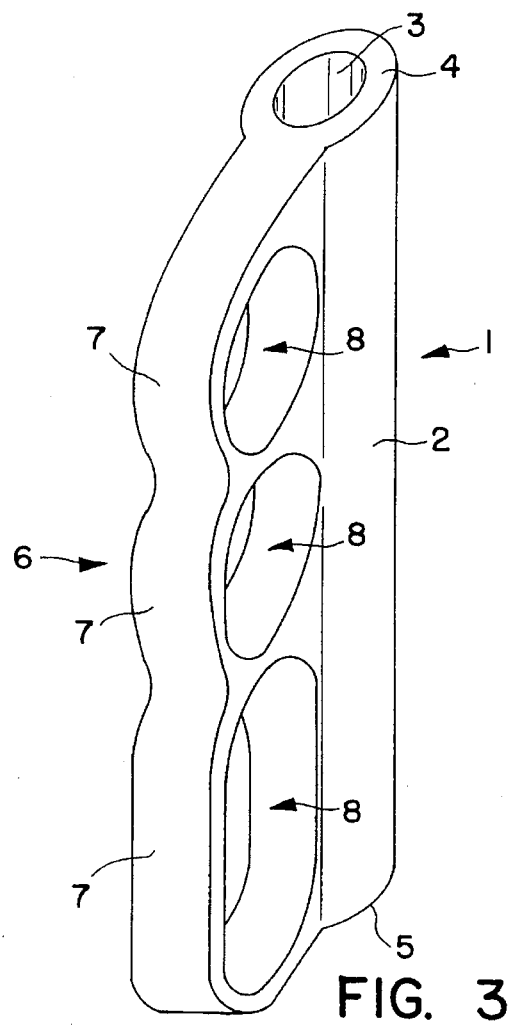
FIG. 3 is a perspective view of an alternative embodiment of the handle of the present invention.

A first embodiment of the invention is shown in FIG. 1, and comprises a handle 1 molded from a suitable rigid plastic material. The handle 1 may be fabricated from other materials, such as wood or metal, but plastic is preferred. Handle 1 comprises an elongated handle body 2 having a central longitudinal channel 3 which is open at the upper end 4 of handle 1 and preferably closed at the lower end 5. Extending perpendicularly to the longitudinal axis of body 2 is rigid finger engaging means 6 which is integrally molded with the body 2. Finger engaging means 6 comprises loop or ring 7 of the molded handle material forming aperture 8 which can accommodate at least one finger of the user's hand 9 as shown in FIG. 2.

In an alternative embodiment, as shown in FIG. 3, finger engaging means 6 may comprise a plurality of loops 7 in a linearly adjacent arrangement along the length of handle 1. Although shown with two loops 7 substantially circular, each accommodating individual fingers of the hand, and a third loop 7 linearly elongated so as to accommodate two fingers together, the number and size of loops 7 is variable within the scope of the present invention to encompass different arrangements and placement of finger engaging means 6. Thus, loop 7 of the embodiment of FIG. 1 may be elongated to accommodate more than one finger and may be placed at any location along the length of handle body 2. Apertures 8 of loops 7 may be any shape. However, preferably they are substantially circular in the case of loops accommodating a single finger and substantially linearly oval in loops accommodating a plurality of fingers. Furthermore, the sizes of the apertures 8 are preferably sufficient to accommodate the fingers when gloves are worn. However, apertures 8 should be only as large as is necessary for the fingers to fit comfortably therethrough. If they are too large, the umbrella, or other article on which the handle 1 is mounted, will not be sufficiently supported while the fingers are used to perform other tasks. The width of loops 7 is preferably such as to provide support over a major portion of the length of the fingers between the base of the fingers and the first knuckle thereof.

Figure 5:
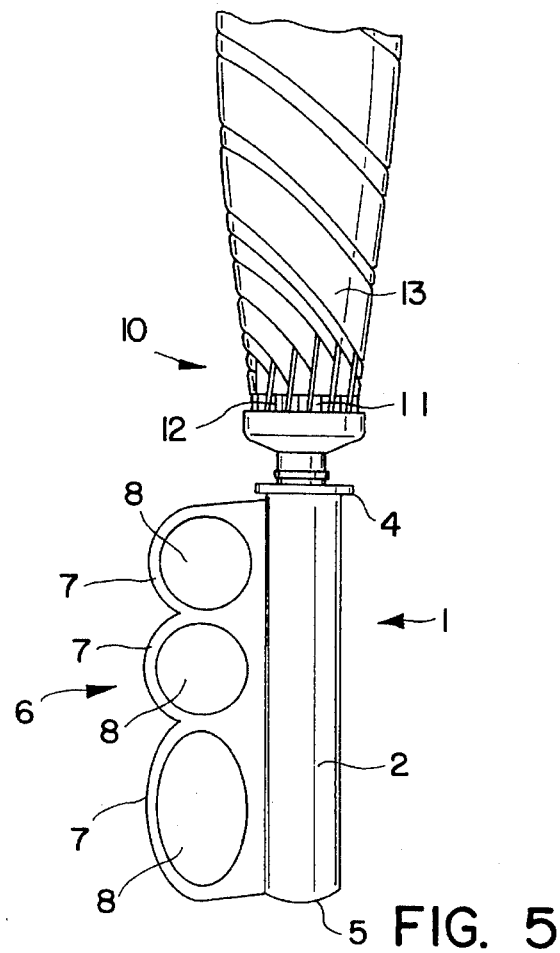
FIG. 5 is a partial view of an improved umbrella according to the present invention.

FIG. 5 shows an umbrella 10 with a handle 1 according to the present invention. Umbrella 10 includes shaft 11, ribs 12 and canopy 13 which are common to umbrellas. An operating mechanism, which is not shown and which may be manual or automatic, is also included as a common part of umbrellas. Handle 1 is attached to the lower end of shaft 11 by inserting shaft 11 into channel 3 and securing handle 1 to shaft 11 in a manner common to umbrella construction. Handle 1 is positioned relative to the operating parts of the umbrella 10 so that, when umbrella 10 is closed, the ends of ribs 12 are spaced above the upper end 4 of handle 1 so as to avoid interference with the finger engaging means 6.

Figure 4:
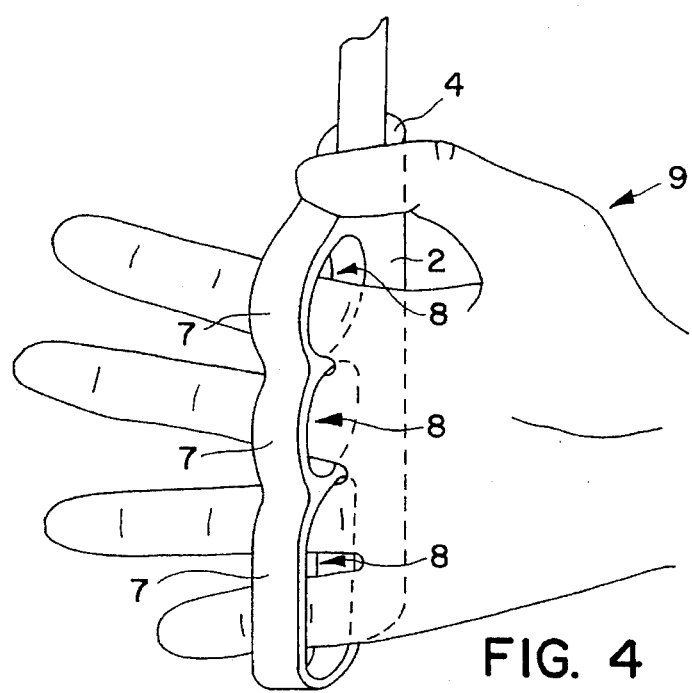
FIG. 4 is a perspective view of the embodiment of FIG. 3 in use on a hand.
Figure 6:
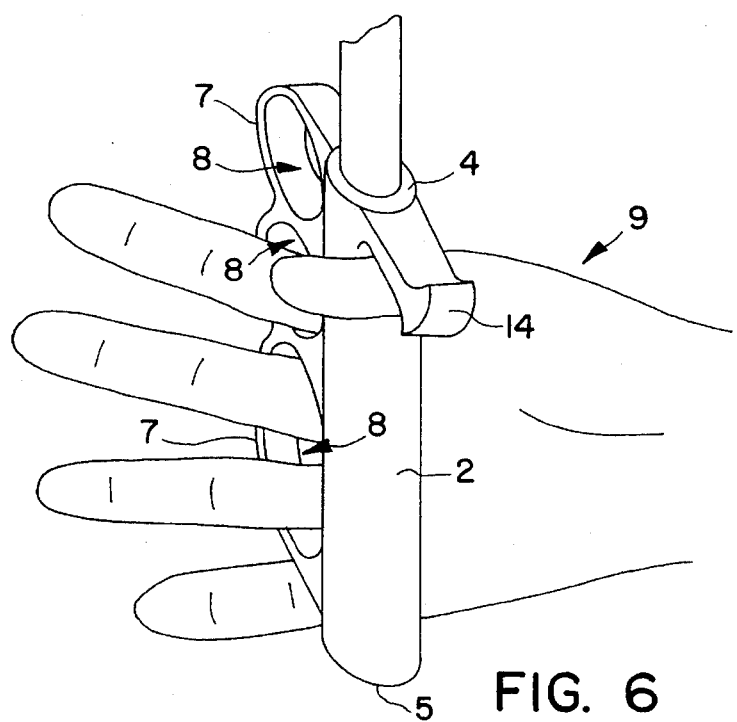
FIG. 6 is a perspective view of a further alternative embodiment of the handle of the present invention in an alternative manner of use.

The handle of this invention provides support for an article such as an umbrella on one's hand 9 while simultaneously allowing the fingers and thumb to be used to manipulate other articles. FIGS. 2, 4 and 6 illustrate alternative manners in which this is accomplished. The hand, fingers and thumb may be placed in a variety of positions relative to the handle 1. In the preferred manner, the fingers of the hand 9 are placed through apertures 8 of loops 7 such that body 2 is laid against the back of the fingers along the line of the first knuckles of the hand. This is shown in FIGS. 2 and 4. The support provided by loops 7 resting on the fingers and the body 2 against the back of the fingers maintain the umbrella in an upright attitude while allowing the fingers to be used in the normal manner to sort mail, handle keys, packages, etc., or even to shake hands. Particularly where handle 1 has only one loop 7, any finger or combination of fingers may be placed through its aperture. However, even where the finger engaging means 6 comprises a plurality of loops 7 and apertures 8, the fingers may be placed therethrough in any combination accommodated by the size, shape and positioning of the loops 7 or that the user finds comfortable.

FIG. 6 illustrates an alternative embodiment of the present invention wherein a thumb engaging member 14 is included. Thumb engaging member 14, like the finger engaging means 6, is preferably molded as an integral part of the handle 1 and extends perpendicularly from body 2 in a direction which is diametrically opposite to loops 7. Thumb engaging member 14 may be in the form of a loop having an aperture to accommodate the thumb, but is preferably in the form of a T providing thumb engagement on both the upper and lower sides of the thumb engaging member 14. Member 14 is preferably located on handle body 2 at a point near to but slightly below the upper end 4. FIG. 6 also illustrates an alternative manner of using the handle 1 of the invention wherein handle body 2 is positioned inside the hand against the palm. In this position the user's thumb can engage the thumb engaging member 14 for added stability of the article being held.

Figure 9:
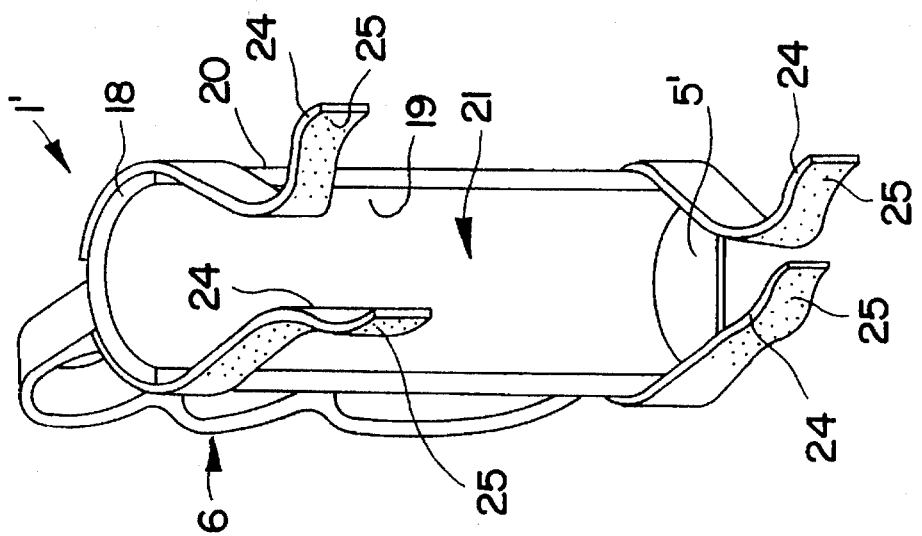
FIG. 9 is a view of the accessory handle according to the present invention showing a third attachment means.
Figure 8:
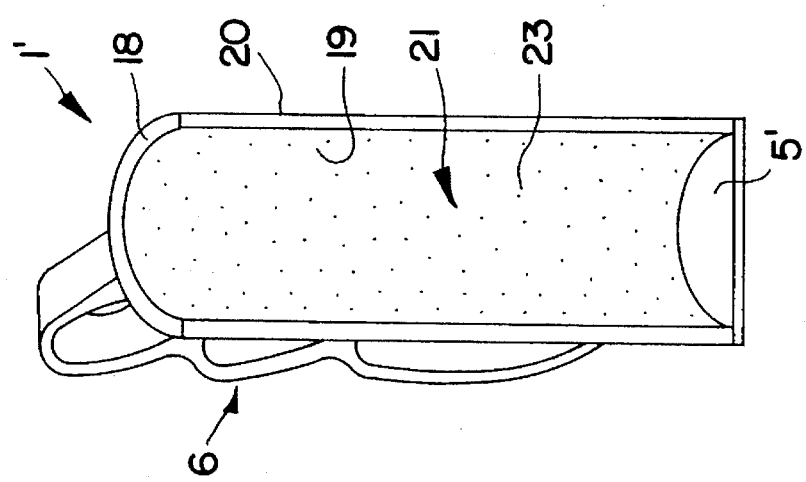
FIG. 8 is a view of the accessory handle according to the present invention showing a second attachment means.
Figure 7:
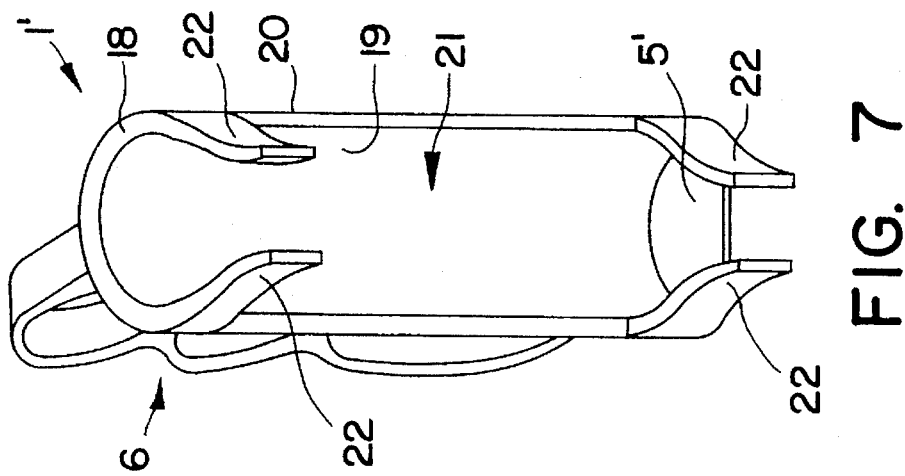
FIG. 7 is a view of the accessory handle according to the present invention showing a first attachment means.

In a still further alternative embodiment, the handle 1 of this invention may be provided as an accessory handle 1' for mounting on the handles of existing umbrellas, or other articles. This embodiment is illustrated in FIGS. 7, 8 and 9. As an accessory handle 1', the body 2 is preferably molded as a semicylinder 18 having a concave inner surface 19, corresponding to channel 3, and a convex outer surface 20. In this form, accessory handle 1' may be mounted on the existing handle of an umbrella or other article and held by a suitable attachment means. An end plate 5' may be provided at the lower end 5 of handle 1' closing one end of the semicylinder 18 as a support to abut the end of an existing handle on which accessory handle 1' is mounted. As an alternative to a semicylinder, handle 1' may have such other shape as will fit and conform to existing handles, for example, U-shape, an open rectangle, and open triangle, or the like. In the accessory handle 1' embodiment, the finger engaging means 6 extends from the convex outer surface 20 in a direction which is preferably 180° opposite to the open face 21 of semicylinder 18.

Suitable attachment means may be any means which will provide positive and secure mounting of the accessory handle 1' on an existing handle such that the accessory handle 1' will not slip or move relative to the handle on which it is mounted. In this respect, end plate 5' assists in preventing longitudinal slippage by providing a base against which the end of an existing handle may abut. FIGS. 7, 8 and 9 illustrate preferred attachment means. In FIG. 7, the attachment means is shown as two pairs of resilient clip members 22, one at each end of the accessory handle 1', which extend arcuately from opposite edges of the open face 21 of semicylinder 18. The clip members project over the concave inner surface 19 and are spreadable to clip over and engage a handle on which the accessory handle 1' is mounted. FIG. 8 illustrates the use of an adhesive 23 applied to the concave inner surface of semicylinder 18. Preferably this is a contact adhesive and may be covered with a protective release sheet which is removed before application of the accessory handle 1' to an existing handle. However, any suitable adhesive may be used. FIG. 9 illustrates a further alternative attachment means in the form of strap members 24 which are secured to semicylinder 18 so as to encircle an existing handle on which the accessory handle 1' is mounted. Strap members 24 are provided with securing means 25, such as a hook and loop fastener, to secure the straps together about a handle. Adhesive may be applied to the concave inner surface of semicylinder 18 and used in combination with either the resilient clips 22 of FIG. 7 or the straps 24 of FIG. 9 for added security in mounting the accessory handle 1' on an existing handle.

Whichever embodiment of the present invention is used, the manner of use is substantially identical in that the handle 1 is placed on the hand with at least one finger of the hand 9 passing through the aperture 8 of the loop 7 in the finger engaging means 6. The rigidity and fit of the loop 7 about the finger in combination with the length of the body 2 against the hand support the umbrella or other article in a position of use without having to curl the fingers around the handle 1 in a normal grasping action. In this manner, the user's fingers are free to manipulate other articles without dropping the umbrella or other article. Alternatively, the handle may be grasped in the normal manner without using the finger engaging means 6 or with the handle body inside the hand 9 against the palm. As disclosed, this latter position permits the finger engaging means 6 to be used and places the thumb engaging member 14 in position to engage the user's thumb and thereby aid in stabilizing the article being held. For example, where the article is an umbrella, this position allows greater control in windy conditions while still freeing the ends of the fingers and thumb to be used to manipulate other articles.

Although described primarily in use with an umbrella, the handle of the present invention may be used in the same manner with any hand carried article where it is desirable to have the ability to simultaneously manipulate other articles with the fingers and thumb of the hand holding the umbrella or other article.

The above embodiments and drawings illustrate the preferred embodiments of the present invention and it is understood that many variations and modifications of those embodiments will be evident to those skilled in the art and may be carried out without departing from the spirit and scope of the present invention.

What is claimed is:

1. In an umbrella having an elongated shaft with an upper end and a lower end, a plurality of articulated ribs pivotally joined to said shaft about the upper end, a flexible canopy attached to said ribs, a mechanism for articulating the ribs to open and close the canopy and a handle attached to the lower end of said shaft and extending in substantial longitudinal alignment with the shaft, the improvement comprising:

rigid finger engaging means joined to and extending perpendicularly from said handle along the longitudinal axis thereof and in linear alignment therewith said finger engaging means comprising at least one aperture adapted to receive at least one finger of a user's hand therethrough with the handle body laid against the hand, whereby the umbrella is capable of being maintained in a substantially upright position of use on the fingers and the fingers and thumb are simultaneously free to manipulate other articles, said finger engaging means comprising a plurality of loops linearly aligned along said handle, at least one loop having a linearly elongated aperture adapted to receive a plurality of fingers of the hand therethrough.

2. The umbrella of claim 1 further comprising thumb engaging means extending perpendicularly from said handle near to the upper end thereof and on a side of said handle diametrically opposite to said loop.

3. The umbrella handle of claim 2 wherein said thumb engaging means comprises a T-shaped member positioned such that the crossbar of the T is parallel to the longitudinal axis of said handle, the leg of said T having upper and lower sides and extending outwardly from said handle near to the upper end thereof whereby said member is engageable by the thumb on both sides when the handle is grasped.

4. An accessory handle for mounting on an existing handle of an article, the accessory handle comprising:

(a) an elongated handle engaging body having a substantially semi-cylindrical inner surface and an outer surface, said inner surface adapted to engage a corresponding outer surface of said existing handle;

(b) rigid finger engaging means extending perpendicularly from and linearly along said outer surface of said body; and (c) attachment means to secure said accessory handle to said existing handle;

whereby said accessory handle provides means whereby said article is held steady in a position of use by one hand while permitting the fingers and thumb of said hand to manipulate other articles, said attachment means comprises at least two pairs of resilient clip members extending arcuately from opposite edges of said handle engaging body on said inner side and adapted to clip over and engage said existing handle at each end of said accessory handle.

5. The accessory handle of claim 4 further comprising adhesive means on said inner surface of said handle engaging body permanently attaching said accessory handle to said existing handle.

6. An accessory handle for mounting on an existing handle of an article, the accessory handle comprising:

(a) an elongated handle engaging body having a substantially semi-cylindrical inner surface and an outer surface, said inner surface adapted to engage a corresponding outer surface of said existing handle;

(b) rigid finger engaging means extending perpendicularly from and linearly along said outer surface of said body; and (c) attachment means to secure said accessory handle to said existing handle;

whereby said accessory handle provides means whereby said article is held steady in a position of use by one hand while permitting the fingers and thumb of said hand to manipulate other articles, said attachment means comprises strap members attached to said handle engaging body and adapted to encircle said existing handle and bind said accessory handle to said existing handle.

7. The accessory handle of claim 6 further comprising adhesive means on said inner surface of said handle engaging body for permanently attaching said accessory handle to said existing handle.

* * * * *